United States Patent
Zhao et al.

(10) Patent No.: US 12,234,335 B2
(45) Date of Patent: Feb. 25, 2025

(54) GAS PERMEABLE POLYTETRAFLUOROETHYLENE STRETCHED FILM AND PREPARATION METHOD THEREOF

(71) Applicant: JIAXING FREBANG NEW MATERIAL TECHNOLOGY CO., LTD, Jiaxing (CN)

(72) Inventors: Xinglei Zhao, Jiaxing (CN); Pan Jiang, Jiaxing (CN); Ting Hua, Jiaxing (CN); Peng Wang, Jiaxing (CN)

(73) Assignee: JIAXING FREBANG NEW MATERIAL TECHNOLOGY CO., LTD, Jiaxing (CN)

( * ) Notice: Subject to any disclaimer, the term of this patent is extended or adjusted under 35 U.S.C. 154(b) by 0 days.

(21) Appl. No.: 18/827,030

(22) Filed: Sep. 6, 2024

(65) Prior Publication Data

US 2024/0425657 A1 Dec. 26, 2024

Related U.S. Application Data

(63) Continuation of application No. PCT/CN2023/122387, filed on Sep. 28, 2023.

(30) Foreign Application Priority Data

Oct. 12, 2022 (CN) .......................... 202211247190.8

(51) Int. Cl.

| | | |
|---|---|---|
| C08J 5/18 | (2006.01) | |
| C08F 2/30 | (2006.01) | |
| C08F 210/06 | (2006.01) | |
| C08F 214/26 | (2006.01) | |
| C08F 220/20 | (2006.01) | |
| C08F 220/24 | (2006.01) | |
| C08F 222/10 | (2006.01) | |
| C08L 27/18 | (2006.01) | |

(52) U.S. Cl.
CPC ...... *C08J 5/18* (2013.01); *C08F 2/30* (2013.01); *C08F 210/06* (2013.01); *C08F 214/26* (2013.01); *C08F 220/20* (2013.01); *C08F 220/24* (2013.01); *C08F 222/1065* (2020.02); *C08L 27/18* (2013.01); *C08J 2327/18* (2013.01)

(58) Field of Classification Search
CPC ....... C08J 5/18; C08F 214/18–214/287; B32B 27/322
See application file for complete search history.

(56) References Cited

U.S. PATENT DOCUMENTS

| | | | |
|---|---|---|---|
| 2009/0277141 A1 | 11/2009 | Abe et al. | |
| 2013/0283744 A1 | 10/2013 | Nakamura et al. | |
| 2020/0216583 A1 * | 7/2020 | Higuchi | ............... C08F 214/265 |
| 2020/0216591 A1 * | 7/2020 | Higuchi | ................... B29C 48/92 |
| 2021/0403696 A1 | 12/2021 | Wu et al. | |
| 2022/0010118 A1 * | 1/2022 | Nanba | ..................... C08F 14/26 |

FOREIGN PATENT DOCUMENTS

| | | | | |
|---|---|---|---|---|
| CN | 115819912 A | | 3/2023 | |
| WO | WO-2017093145 A1 * | | 6/2017 | ............ C08F 214/22 |

* cited by examiner

*Primary Examiner* — Prashant J Khatri

(57) ABSTRACT

A gas permeable polytetrafluoroethylene stretched film is prepared by bending powder of a modified polytetrafluoroethylene resin and powder of a modified fluoropolymer resin and stretching the powder of the modified polytetrafluoroethylene resin and the powder of the modified fluoropolymer resin. The modified polytetrafluoroethylene resin is copolymerised by mixing a tetrafluoroethylene monomer and a modified monomer. The modified monomer is prepared by reaction of hydroxyethyl acrylate, perfluoroalkylethyl acrylate and isocyanate ethylacrylate. The crystallinity in the system is greatly reduced through the multi-branched structure of the modified polytetrafluoroethylene polymer, and at the same time, the strenching strength of the gas permeable polytetrafluoroethylene stretched film is greatly improved through adding the modified fluoropolymer powder. In this manner, the polytetrafluoroethylene stretched film has strong permeability and waterproofness, thereby having stronger safety. The polytetrafluoroethylene stretched film can be used for the protection of precision instruments such as electronics.

9 Claims, No Drawings

GAS PERMEABLE POLYTETRAFLUOROETHYLENE STRETCHED FILM AND PREPARATION METHOD THEREOF

CROSS-REFERENCE TO RELATED APPLICATIONS

This application is a continuation of International Patent Application No. PCT/CN2023/122387 with a filing date of Sep. 28, 2023, designating the United States, now pending, and further claims priority to Chinese Patent Application No. 202211247190.8 with a filing date of Oct. 12, 2022. The content of the aforementioned applications, including any intervening amendments thereto, is incorporated herein by reference.

TECHNICAL FIELD

The present disclosure relates to the field of polymeric film material, in particular, a gas permeable polytetrafluoroethylene stretched film and a preparation method thereof.

BACKGROUND

A stretched film is a thermoplastic plastic film that stretches in vertical and horizontal stretching directions of the film during the production process while contracting by heat during the use process. At present, commonly used stretched films can be divided into a PVC film, a polyethylene film, a polycatum film, a polystyrene film, a polypropylene film, a nylon film, etc. The stretched films can be used to pack various products. According to different materials, the stretched films are used in different fields and are widely used in the fields of food, drinks, automobile supplies, daily chemicals, stationery, medicine, etc.

With the improvement demand of consumers for health, environmental protection, green and other aspects, the stretched film develops to be non-toxic, biodegradable, easy to recycle, and high recycling rate. The polyethylene film is commonly used as one of base materials for heat shrinkable film. The polyethylene film has good flexibility, impact resistance, tear resistance, breakage resistance, moisture resistance, and high shrinkage rate. The polyethylene film is widely used in the whole collection of packaging of products such as alcohol, cans, mineral water, a variety of beverages, and cloth. The pvc film, based on the characteristics of high transparency, good gloss, and high shrinkage and having the performance of rain proof, fire resistance, anti-static, and formability, is widely used in the building materials industry and packaging industry.

To be used in the protection of precision instruments such as circuits, and wires, a polytetrafluoroethylene stretched film has appeared on the market. The polytetrafluoroethylene stretched film, also called as Teflon film, is made of suspended polytetrafluoroethylene resin by molding, sintering, cooling into a work blank, and then by turning, calendering. The polytetrafluoroethylene stretched film has the advantages of the most significant anti-voltage strength and breakdown voltage, and is used as capacitor medium, wire insulation, electrical instrument insulation, sealing gasket and so on.

The polytetrafluoroethylene film is prepared in a bi-directional stretching method. The scanning electron microscope can observe that the film is made of criss-crossed fibers interconnected. Gaps between fiber filaments form micropores of the film. Many micropores are provided on the surface of the film, with about 9 billion micropores per square inch. The diameter of each micropore is mainly about 0.8~1 μm. However, due to the high crystallinity of polytetrafluoroethylene, the size and shape of the pores generated during the stretching are uneven, and large-sized pores will appear. Moreover, due to the limitation of stretching strength, a larger stretching ratio cannot be used, and the final stretched pores are less, affecting the gas permeability and waterproof performance of the polytetrafluoroethylene stretched film. Therefore, the polytetrafluoroethylene stretched film cannot be used in the protection of precision instruments such as electronic products.

SUMMARY

In view of the shortcomings in the prior art, the object of the present disclosure is to provide a polytetrafluoroethylene stretched film having high gas permeability and waterproofness and a preparation method thereof, enhancing the safety of the polytetrafluoroethylene stretched film so that the polytetrafluoroethylene stretched film can be applied to the protection of electronic products.

A gas permeable polytetrafluoroethylene stretched film is prepared by mixing powder of a modified polytetrafluoroethylene resin and powder of a modified fluoropolymer resin and stretching the resulting mixed product.

The modified polytetrafluoroethylene resin is copolymerised by a mixture of a tetrafluoroethylene monomer and a modified monomer.

The structure of the modified monomer is a compound shown in formula I:

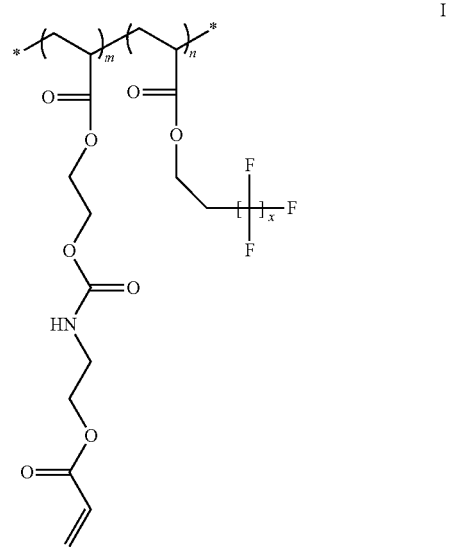

where m:n=(1-2):20, x denotes 4, 6, 8, 10.

The crystallinity in the system is greatly reduced through the multi-branched structure of the modified polytetrafluoroethylene polymer.

Further, the powder of the modified fluoropolymer resin is a copolymer of propylene and tetrafluoroethylene.

The powder of the modified fluoropolymer resin may be Asahi Glass AFLAS100 and Asahi Glass AFLAS150.

The addition of modified fluoropolymer powder increases the stretching strength of the polytetrafluoroethylene stretched film to a relatively large extent, and thus the final stretching film is stretched by a greater number of times.

Further, the preparation method of the modified monomer includes:

(1) in parts by weight, adding 30 to 50 parts of perfluoroheptane to a reactor as a solvent, heating the perfluoroheptane to a temperature of 60 to 70° C., then evenly mixing 50 to 70 parts of a first mixture of hydroxyethyl acrylate and perfluoroalkylethyl acrylate with 0.5 to 1 part of an initiator to obtain a second mixture, adding dropwise the second mixture into the reactor at a constant speed, and after the dropwise addition is completed, keeping the temperature for 2 to 4 hours;

(2) adding 6 to 12 parts of isocyanate ethylacrylate to the reactor, heating the temperature to 70 to 75° C., continuously stirring until content of system-NCO groups is less than 0.05%; and (3) cooling down the reaction system and removing the solvent of perfluoroheptane to obtain the modified monomer.

The reaction equation for the preparation of modified monomers is:

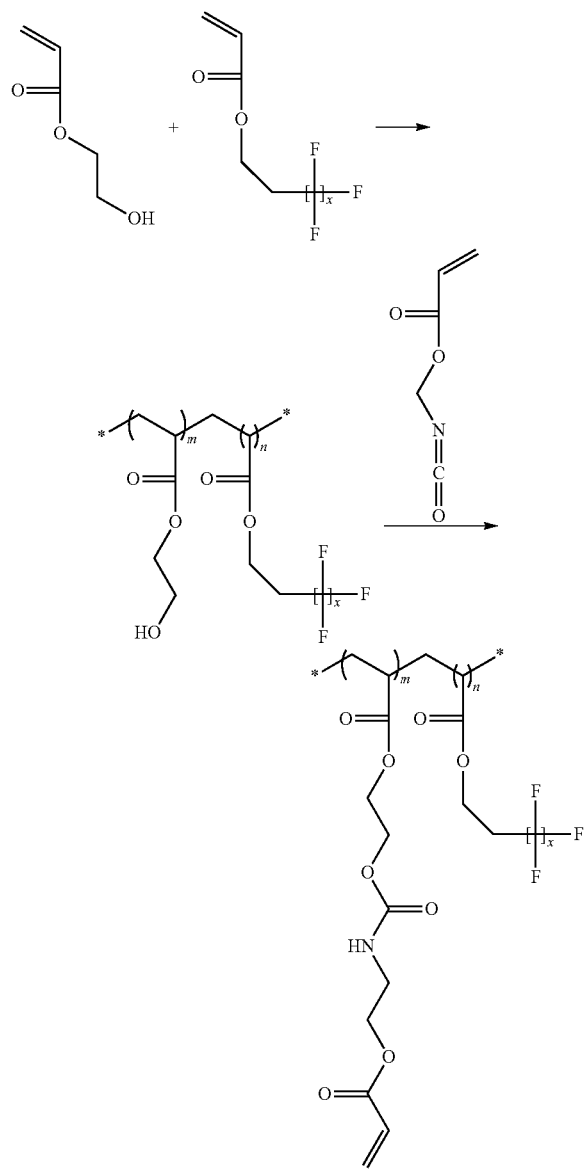

Further, the initiator in the step (1) is azobisisobutyronitrile or benzoyl peroxide.

Further, a preparation method of the powder of the modified polytetrafluoroethylene resin comprises:

adding a dispersant, an emulsifier and deionized water into a high-pressure emulsification reactor, and evenly emulsifying at a stirring speed of 1000 to 2000 r/min;

decreasing the stirring speed to 200 to 400r/min, and then increasing a temperature in the reactor to 40 to 60° C. and a pressure in the reactor to 3 to 4 MPa; and pumping both the mixture of the tetrafluoroethylene monomer and the modified monomer and an initiator into the high-pressure emulsification reactor through a high-pressure pump, heating the reactor to 60 to 80° C., and curing for 2 to 4 hours to obtain the modified polytetrafluoroethylene resin.

Further, based on a total amount of feedstocks of the prepared powder of the modified polytetrafluoroethylene resin as 100%, a mass percentage of each feedstock is as follows:

| | |
|---|---|
| dispersant | 0.1-1% |
| emulsifier | 0.2-1% |
| tetrafluoroethylene monomer | 40-60% |
| modified monomer | 1-1.5% |
| initiator | 0.5-3% | the balance being water.

Further, in the step (1), the dispersant is ammonium perfluorooctanoate, and the emulsifier is perfluoropolyether.

Further, in the step (3), the initiator is selected from one of perfluorbutyryl peroxide or perfluorcaproyl peroxide.

A preparation method of the gas permeable polytetrafluoroethylene stretched film includes the following steps:

evenly mixing the powder of the modified polytetrafluoroethylene resin and the powder of the modified fluoropolymer resin, pushing and pressing the mixed powder into round strips at 50 to 55° C., then calendering the round strips at 60 to 65° C. to form a base film, wherein a thickness of the base film is less than 100 mm;

degreasing the base film in the step (1) at 250 to 260° C., after the degreasion, stretching the base film longitudinally by a factor of 6 to 8, and then stretching the base film horizontally by a factor of 3 to 5; and (3) sintering the stretched film obtained in the step (2) at 340 to 360° C. for 1 to 2 minutes to obtain a gas permeable polytetrafluoroethylene stretched film.

Further, a mass ratio of the powder of the modified fluoropolymer resin and the powder of the modified polytetrafluoroethylene resin is 1:(3-10).

Beneficial Effects

The modified polytetrafluoroethylene polymer provided by the present disclosure has a multi-branched structure, greatly reducing the crystallinity in the system. Therefore, very uniform pores are formed when stretched, thereby having better gas permeability. Meanwhile, due to the uniform pores, no occasional large-sized pore exists, improving the waterproofing effect.

In the present disclosure, the powder of the modified polytetrafluoroethylene resin and the powder of the modified fluoropolymer resin are mixed so that the stretching strength of the gas permeable polytetrafluoroethylene stretched film can be greatly improved, thereby allowing the final stretched film to be stretched more times, and a higher number of pores per unit mass to be generated, improving the gas permeability.

DETAILED DESCRIPTION

The present disclosure will be described below in connection with specific embodiments. It is to be noted that the embodiments are examples of the present disclosure, are merely used for illustrating the present disclosure, and are not intended to limit the present disclosure. Other combinations and variations may be made without departing from the spirit or scope of the subject matter of the present disclosure.

The perfluoroalkylethyl acrylate in the present disclosure is purchased from Jinan Guochen Taifu Chemical Co. Ltd. The powder of the modified fluoropolymer resin is Asahi Glass AFLAS100 and Asahi Glass AFLAS150 from Asahi Glass Co. Ltd. The polytetrafluoroethylene film and the F46 film are purchased through Taizhou Tongjida New Material Co. Ltd. The rest of reagents and equipment are conventional reagents and equipment in the art.

Preparation of Modified Monomer-1

In parts by weight, 30 parts of perfluoroheptane is added to the reactor as a solvent, the perfluoroheptane was heated to 65° C., then 60 parts of mixture of hydroxyethyl acrylate and 5 parts of perfluoroalkylethyl acrylate were evenly mixed with 0.5 part of azobisisobutyronitrile, the hydroxyethyl acrylate, the perfluoroalkylethyl acrylate and the azobisisobutyronitrile were added dropwise into the reactor at a constant speed, and after the dropwise addition was completed, the reactor was kept warm for 3 hours.

5 parts of isocyanate ethylacrylate was added to the reactor, the temperature was heated to 70° C., the solvent was continuously stirred until content of system-NCO groups content is less than 0.05%.

The reaction system was cooled down and the solvent of perfluoroheptane was removed to obtain the modified monomer-1.

Preparation of Modified Monomer-2

The preparation of modified monomer-2 is basically the same as the preparation of modified monomer-1. The difference of the preparation of modified monomer-2 from the preparation of modified monomer-1 is that the perfluoroalkylethyl acrylate is changed to perfluorohexylethyl acrylate.

Preparation of Modified Monomer-3

The preparation of modified monomer-3 is basically the same as the preparation of modified monomer-1. The difference of the preparation of modified monomer-3 from the preparation of modified monomer-1 is that the perfluoroalkylethyl acrylate is changed to perfluorooctylethyl acrylate.

Preparation of Modified Monomer-4

The preparation of modified monomer-4 is basically the same as the preparation of modified monomer-1. The difference of the preparation of modified monomer-4 from the preparation of modified monomer-1 is that the perfluoroalkylethyl acrylate is changed to perfluorodecylethyl acrylate.

Preparation of Powder of Modified Polytetrafluoroethylene Resin-1

Ammonium perfluorooctanoate, perfluoropolyether and deionized water were added into a high-pressure emulsification reactor, and the ammonium perfluorooctanoate, the perfluoropolyether and the deionized water were evenly emulsified at a stirring speed of 1500 r/min.

The stirring speed was decreased to 300 r/min, and then the temperature in the reactor was increased to 50° C. and the pressure in the reactor was increased to 3.5 MPa.

The tetrafluoroethylene monomer and the mixture of the modified monomer-1 and the perfluorbutyryl peroxide were poured into the high-pressure emulsification reactor through a 2-way high-pressure pump, the tetrafluoroethylene monomer went through one way, and the modified monomer-1 and the initiator went through one way. After all feedstocks poured, the reactor was warmed up to 70° C., cured for 3 hours to prepare the powder of modified polytetrafluoroethylene resin.

Based on the total amount of feedstocks as 100%, the mass percentage of each feedstock is as follows:

| | |
|---|---|
| ammonium perfluorooctanoate | 0.5% |
| perfluoropolyether | 0.5% |
| tetrafluoroethylene monomer | 50% |
| modified monomer-1 | 1% |
| perfluorbutyryl peroxide | 2% | the balance being water.

Preparation of Powder of Modified Polytetrafluoroethylene Resin-2

The preparation of powder of modified polytetrafluoroethylene resin-2 is basically the same as the preparation of powder of modified polytetrafluoroethylene resin-1. The difference of the preparation of powder of modified polytetrafluoroethylene resin-2 from the preparation of powder of modified polytetrafluoroethylene resin-1 is that the modified monomer-1 is changed to modified monomer-2.

Preparation of Powder of Modified Polytetrafluoroethylene Resin-3

The preparation of powder of modified polytetrafluoroethylene resin-3 is basically the same as the preparation of powder of modified polytetrafluoroethylene resin-1. The difference of the preparation of powder of modified polytetrafluoroethylene resin-3 from the preparation of powder of modified polytetrafluoroethylene resin-1 is that the modified monomer-1 is changed to modified monomer-3.

Preparation of Powder of Modified Polytetrafluoroethylene Resin-4

The preparation of powder of modified polytetrafluoroethylene resin-4 is basically the same as the preparation of powder of modified polytetrafluoroethylene resin-1, the difference of the preparation of powder of modified polytetrafluoroethylene resin-4 from the preparation of powder of modified polytetrafluoroethylene resin-1 is that the modified monomer-1 is changed to modified monomer-4.

Embodiment One 10 parts of Asahi Glass AFLAS100 and 100 parts of the powder of modified polytetrafluoroethylene resin-1 were evenly mixed, the mixed powder was pressed into round strips at 50° C., then the round strips were calendered at 60° C. to form a base film, where the thickness of the base film is 90 mm.

The base film in the step (1) was degreased at 250° C., after the degreasion, the base film was stretched longitudinally by a factor of 7, and then the base film was stretched horizontally by a factor of 4.

(3) The stretched film in the step (2) was sintered at 350° C. for 1 minute to obtain the gas permeable polytetrafluoroethylene stretched film.

Embodiment Two

Embodiment two is basically the same as the embodiment two. The difference of the embodiment two from the embodiment one is that 10 parts of Asahi Glass AFLAS100 are changed to 20 parts of Asahi Glass AFLAS100 in the step (1), and the powder of modified polytetrafluoroethylene resin-1 is changed to the powder of modified polytetrafluoroethylene resin-2.

Embodiment Three

Embodiment three is basically the same as the embodiment one. The difference of the embodiment three from the embodiment one is that 10 parts of Asahi Glass AFLAS100 are changed to 30 parts of Asahi Glass AFLAS100 in the step (1), and the powder of modified polytetrafluoroethylene resin-1 is changed to the powder of modified polytetrafluoroethylene resin-3.

Embodiment Four

Embodiment four is basically the same as the embodiment one. The difference of the embodiment four from the embodiment one is that Asahi Glass AFLAS100 are changed to AFLAS150 in the step (1), and the powder of modified polytetrafluoroethylene resin-1 is changed to the powder of modified polytetrafluoroethylene resin-4.

Comparative Example One

The comparative example one is basically the same as the embodiment one. The difference of the comparative example one from the embodiment one is that the powder of modified fluoropolymer resin is changed in an equal amount of the powder of modified polytetrafluoroethylene resin-1.

The base film was broken during the stretching process in the step (2).

Comparative Example Two

Commercially available polytetrafluoroethylene film

Comparative Example Three

Commercially available F46 film
Performance Testing

Gas permeability and waterproofness tests were conducted after testing the size of the pores of the products in the embodiment 1 to 4 and comparative examples 2 and 3 in the following methods. The test results are shown in Table 1.

Gas permeability: the test method is GBT36138-2018 polytetrafluoroethylene flat microfiltration film for sterilization.

Waterproofness: the test method is GB/T 4745-2012 textile waterproofness performance testing and evaluation of spray method.

Pore diameter: the test method is based on HYT 039-1995 microporous filter film pore performance testing method.

TABLE 1

| | Test results | | |
|---|---|---|---|
| | Pore space [μm] | Gas permeability[m$^3$/(m$^2$ · h)] | Waterproofness |
| Embodiment 1 | 0.085-0.09 | 32 | 5 Level |
| Embodiment 2 | 0.085-0.09 | 35 | 5 Level |

TABLE 1-continued

| | Test results | | |
|---|---|---|---|
| | Pore space [μm] | Gas permeability[m$^3$/(m$^2$ · h)] | Waterproofness |
| Embodiment 3 | 0.085-0.09 | 34 | 5 Level |
| Embodiment 4 | 0.085-0.09 | 32 | 5 Level |
| Comparative Example 2 | 0.09-0.11 | 27 | 5 Level |
| Comparative Example 3 | 0.11-0.13 | 18 | 5 Level |

It can be seen from the comparison of Embodiments one to four with Comparative Examples two and three, the gas permeable polytetrafluoroethylene stretched film provided by the present disclosure has smaller and more even pore space, better gas permeability and better waterproofness.

In Comparative Example one, the film was broken during the stretching so that the powder of the modified fluoropolymer resin added in the present disclosure is able to improve the stretching strength to a relatively large extent, thereby allowing the final stretched film to be stretched more times.

The preceding embodiments aim to only illustrate the technical concepts and features of the present disclosure, and allow those skilled in the art to understand the contents of the present disclosure and to implement the present disclosure, and are not intend to limit the scope of the present disclosure. Any equivalent changes or modifications made in accordance with the spirit of the present disclosure shall be within the scope of the present disclosure.

What is claimed is:

1. A gas permeable polytetrafluoroethylene stretched film, comprising: powder of a modified polytetrafluoroethylene resin and powder of a modified fluoropolymer resin; wherein the gas permeable polytetrafluoroethylene stretched film is prepared by mixing the powder of the modified polytetrafluoroethylene resin and the powder of the modified fluoropolymer resin to obtain a product, and stretching the product to obtain the gas permeable polytetrafluoroethylene stretched film;

the powder of the modified fluoropolymer resin is a copolymer of propylene and tetrafluoroethylene;

the modified polytetrafluoroethylene resin is copolymerised by a mixture of a tetrafluoroethylene monomer and a modified monomer;

a mass ratio of the tetrafluoroethylene monomer and the modified monomer is 40:1.5-60:1; and the structure of the modified monomer is a compound shown in formula I:

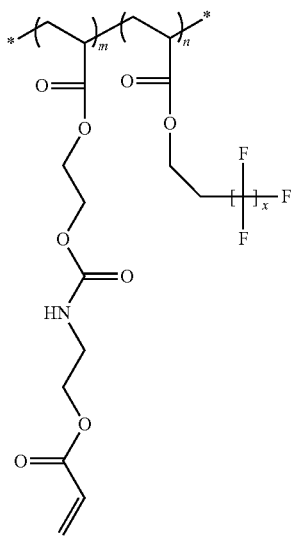

wherein m:n=1:20-1:10, x denotes 4, 6, 8, 10.

2. The gas permeable polytetrafluoroethylene stretched film according to claim 1, wherein a preparation method of the modified monomer comprises:
  (1) in parts by weight, adding 30 to 50 parts of perfluoroheptane to a reactor as a solvent, heating the perfluoroheptane to a temperature of 60 to 70° C., then evenly mixing 50 to 70 parts of a first mixture of hydroxyethyl acrylate and perfluoroalkylethyl acrylate with 0.5 to 1 part of an initiator to obtain a second mixture, adding dropwise the second mixture into the reactor at a constant speed, and after the dropwise addition is completed, keeping the temperature for 2 to 4 hours;
  (2) adding 6 to 12 parts of isocyanate ethylacrylate to the reactor, heating the temperature to 70 to 75-° C., continuously stirring until content of system-NCO groups is less than 0.05%; and
  (3) cooling down and removing the solvent of perfluoroheptane to obtain the modified monomer.

3. The gas permeable polytetrafluoroethylene stretched film according to claim 2, wherein the initiator in the step (1) is azobisisobutyronitrile or benzoyl peroxide.

4. The gas permeable polytetrafluoroethylene stretched film according to claim 1, wherein a preparation method of the powder of the modified polytetrafluoroethylene resin comprises:
  (1) adding a dispersant, an emulsifier and deionized water into a high-pressure emulsification reactor, and evenly emulsifying at a stirring speed of 1000 to 2000 r/min;
  (2) decreasing the stirring speed to 200 to 400 r/min, and then increasing a temperature in the reactor to 40 to 60° C. and a pressure in the reactor to 3 to 4 MPa; and
  (3) pumping both the mixture of the tetrafluoroethylene monomer and the modified monomer and an initiator into the high-pressure emulsification reactor through a high-pressure pump, heating the reactor to 60 to 80° C., and curing for 2 to 4 hours to obtain the modified polytetrafluoroethylene resin.

5. The gas permeable polytetrafluoroethylene stretched film according to claim 4, wherein based on a total amount of feedstocks as 100%, a mass percentage of each feedstock is as follows:

| | |
|---|---|
| dispersant | 0.1-1% |
| emulsifier | 0.2-1% |
| tetrafluoroethylene monomer | 40-60% |
| modified monomer | 1-1.5% |
| initiator | 0.5-3% | the balance being water.

6. The gas permeable polytetrafluoroethylene stretched film according to claim 4, wherein in the step (1), the dispersant is ammonium perfluorooctanoate, and the emulsifier is perfluoropolyether.

7. The gas permeable polytetrafluoroethylene stretched film according to claim 4, wherein in the step (3), the initiator is perfluorbutyryl peroxide or perfluorcaproyl peroxide.

8. A method for preparing the gas permeable polytetrafluoroethylene stretched film according to claim 1, comprising the following steps:
  (1) evenly mixing the powder of the modified polytetrafluoroethylene resin and the powder of the modified fluoropolymer resin, pushing and pressing the mixed powder into round strips at 50 to 55° C., then calendering the round strips at 60 to 65° C. to form a base film, wherein a thickness of the base film is less than 100 mm;
  (2) degreasing the base film in the step (1) at 250 to 260° C., after the degreasion, stretching the base film longitudinally by a factor of 6 to 8, and then stretching the base film horizontally by a factor of 3 to 5; and
  (3) sintering the stretched film obtained in the step (2) at 340 to 360° C. for 1 to 2 minutes to obtain the gas permeable polytetrafluoroethylene stretched film.

9. The method according to claim 8, wherein a mass ratio of the powder of the modified fluoropolymer resin and the powder of the modified polytetrafluoroethylene resin is 1:3-1:10.

\* \* \* \* \*